US007765581B1

(12) United States Patent
Caronni et al.

(10) Patent No.: US 7,765,581 B1
(45) Date of Patent: Jul. 27, 2010

(54) SYSTEM AND METHOD FOR ENABLING SCALABLE SECURITY IN A VIRTUAL PRIVATE NETWORK

(75) Inventors: Germano Caronni, Palo Alto, CA (US); Amit Gupta, Fremont, CA (US); Sandeep Kumar, Santa Clara, CA (US); Tom R. Markson, San Mateo, CA (US); Christoph L. Schuba, Mountain View, CA (US); Glenn C. Scott, Mountain View, CA (US)

(73) Assignee: Oracle America, Inc., Redwood City, CA (US)

( * ) Notice: Subject to any disclaimer, the term of this patent is extended or adjusted under 35 U.S.C. 154(b) by 0 days.

(21) Appl. No.: 09/457,914

(22) Filed: Dec. 10, 1999

(51) Int. Cl.
*H04L 9/00* (2006.01)
(52) U.S. Cl. ............................... 726/3; 726/15
(58) Field of Classification Search ......... 713/151–154, 713/200–201; 709/200–203, 213–215; 711/147–149; 380/201–202, 241, 33; 726/2–6, 15, 30
See application file for complete search history.

(56) References Cited

U.S. PATENT DOCUMENTS

| | | | |
|---|---|---|---|
| 4,821,169 A | * | 4/1989 | Sites et al. ................. 711/206 |
| 4,825,354 A | | 4/1989 | Agrawal et al. |
| 5,115,466 A | | 5/1992 | Presttun et al. |
| 5,144,665 A | | 9/1992 | Takaragi et al. |
| 5,220,604 A | | 6/1993 | Gasser et al. |
| 5,241,599 A | | 8/1993 | Bellovin et al. |
| 5,319,738 A | * | 6/1994 | Shima et al. ................. 706/34 |
| 5,331,637 A | | 7/1994 | Francis et al. |
| 5,335,346 A | | 8/1994 | Fabbio |
| 5,519,833 A | | 5/1996 | Agranat et al. |
| 5,570,366 A | | 10/1996 | Baker et al. |
| 5,572,528 A | * | 11/1996 | Shuen ..................... 370/402 |

(Continued)

FOREIGN PATENT DOCUMENTS

EP 0 702 477 A2 3/1996

(Continued)

OTHER PUBLICATIONS

Armitage G.J., "IP Multicasting Over ATM Networks," *IEEE Journal on Selected Areas in Communications*, vol. 15, pp. 445-455 (1997).

(Continued)

*Primary Examiner*—Kimyen Vu
*Assistant Examiner*—Leynna T Truvan
(74) *Attorney, Agent, or Firm*—Marsh Fischmann & Breyfogle LLP; Kent A. Lembke; Matthew A. Kaminer

(57) ABSTRACT

Methods and systems consistent with the present invention provide dynamic security policies that change the granularity of the security at the node level, process level, or socket level. Specifically, a channel number and virtual address are associated with various processes included in a process table. Since a security policy is required for all processes, secure and insecure processes located on the same channel may communicate with one another. Moreover, processes located on different channels may communicate with one another by a gateway that connects both channels. This scalable blanketing security approach provides an institutionalized method for securing any process, node or socket by providing a unique mechanism for policy enforcement at runtime or by changing the security policies.

37 Claims, 11 Drawing Sheets

U.S. PATENT DOCUMENTS

| | | | |
|---|---|---|---|
| 5,608,865 A * | 3/1997 | Midgely et al. | 714/1 |
| 5,623,601 A | 4/1997 | Vu | |
| 5,636,371 A * | 6/1997 | Yu | 703/26 |
| 5,696,763 A | 12/1997 | Gang, Jr. | |
| 5,719,942 A | 2/1998 | Aldred et al. | |
| 5,720,035 A | 2/1998 | Allegre et al. | |
| 5,732,137 A | 3/1998 | Aziz | |
| 5,748,736 A | 5/1998 | Mittra | |
| 5,758,182 A * | 5/1998 | Rosenthal et al. | 710/3 |
| 5,771,291 A | 6/1998 | Newton et al. | |
| 5,774,660 A * | 6/1998 | Brendel et al. | 709/201 |
| 5,802,320 A | 9/1998 | Baehr et al. | |
| 5,802,397 A * | 9/1998 | Greenstein et al. | 710/36 |
| 5,818,845 A | 10/1998 | Moura et al. | |
| 5,825,890 A * | 10/1998 | Elgamal et al. | 713/151 |
| 5,835,723 A | 11/1998 | Andrews et al. | |
| 5,856,974 A | 1/1999 | Gervais et al. | |
| 5,864,683 A | 1/1999 | Boebert et al. | |
| 5,884,024 A | 3/1999 | Lim et al. | |
| 5,905,984 A | 5/1999 | Thorsen | |
| 5,912,891 A * | 6/1999 | Kanai | 370/395.51 |
| 5,931,947 A | 8/1999 | Burns et al. | |
| 5,933,420 A | 8/1999 | Jaszewski et al. | |
| 5,935,235 A * | 8/1999 | Angle et al. | 712/34 |
| 5,950,195 A | 9/1999 | Stockwell et al. | |
| 5,960,177 A | 9/1999 | Tanno | |
| 5,963,731 A * | 10/1999 | Sagawa et al. | 703/6 |
| 5,987,453 A | 11/1999 | Krishna et al. | |
| 5,987,506 A | 11/1999 | Carter et al. | |
| 5,999,531 A | 12/1999 | Ferolito et al. | |
| 6,026,430 A | 2/2000 | Butman et al. | |
| 6,049,528 A * | 4/2000 | Hendel et al. | 370/235 |
| 6,049,878 A | 4/2000 | Caronni et al. | |
| 6,055,575 A | 4/2000 | Paulsen et al. | |
| 6,061,346 A | 5/2000 | Nordman | |
| 6,061,796 A | 5/2000 | Chen et al. | |
| 6,067,608 A * | 5/2000 | Perry | 711/203 |
| 6,078,586 A | 6/2000 | Dugan et al. | |
| 6,079,020 A * | 6/2000 | Liu | 713/201 |
| 6,081,900 A | 6/2000 | Subramaniam et al. | |
| 6,128,298 A | 10/2000 | Wootton et al. | |
| 6,130,892 A | 10/2000 | Short et al. | |
| 6,134,591 A | 10/2000 | Nickles | |
| 6,141,755 A | 10/2000 | Dowd et al. | |
| 6,148,323 A | 11/2000 | Whitner et al. | |
| 6,158,011 A | 12/2000 | Chen et al. | |
| 6,173,399 B1 | 1/2001 | Gilbrech | |
| 6,175,916 B1 * | 1/2001 | Ginsberg et al. | 712/228 |
| 6,175,917 B1 | 1/2001 | Arrow et al. | |
| 6,185,215 B1 * | 2/2001 | Aho | 370/402 |
| 6,188,694 B1 | 2/2001 | Fine et al. | |
| 6,192,394 B1 | 2/2001 | Gutfreund et al. | |
| 6,212,558 B1 | 4/2001 | Antur et al. | |
| 6,212,633 B1 | 4/2001 | Levy et al. | |
| 6,215,877 B1 | 4/2001 | Matsumoto | |
| 6,219,694 B1 | 4/2001 | Lazaridis et al. | |
| 6,226,678 B1 * | 5/2001 | Mattaway et al. | 709/230 |
| 6,226,751 B1 | 5/2001 | Arrow et al. | |
| 6,236,652 B1 | 5/2001 | Preston et al. | |
| 6,253,238 B1 | 6/2001 | Lauder et al. | |
| 6,256,658 B1 | 7/2001 | Mourey et al. | |
| 6,259,791 B1 | 7/2001 | Moore | |
| 6,275,938 B1 | 8/2001 | Bond et al. | |
| 6,279,029 B1 | 8/2001 | Sampat et al. | |
| 6,304,973 B1 | 10/2001 | Williams | |
| 6,307,837 B1 | 10/2001 | Ichikawa et al. | |
| 6,308,282 B1 | 10/2001 | Huang et al. | |
| 6,324,582 B1 * | 11/2001 | Sridhar et al. | 709/230 |
| 6,327,252 B1 | 12/2001 | Silton et al. | |
| 6,330,671 B1 | 12/2001 | Aziz | |
| 6,332,195 B1 | 12/2001 | Green et al. | |
| 6,333,918 B1 | 12/2001 | Hummel | |
| 6,335,926 B1 | 1/2002 | Silton et al. | |
| 6,353,891 B1 | 3/2002 | Borella et al. | |
| 6,370,552 B1 * | 4/2002 | Bloomfield | 715/513 |
| 6,374,298 B2 | 4/2002 | Tanno | |
| 6,377,811 B1 | 4/2002 | Sood et al. | |
| 6,377,997 B1 | 4/2002 | Hayden | |
| 6,393,484 B1 | 5/2002 | Massarani | |
| 6,393,485 B1 | 5/2002 | Chao et al. | |
| 6,396,815 B1 * | 5/2002 | Greaves et al. | 370/256 |
| 6,401,128 B1 | 6/2002 | Stai et al. | |
| 6,415,323 B1 | 7/2002 | McCanne et al. | |
| 6,434,156 B1 | 8/2002 | Yeh | |
| 6,434,624 B1 * | 8/2002 | Gai et al. | 709/232 |
| 6,446,109 B2 | 9/2002 | Gupta | |
| 6,452,925 B1 | 9/2002 | Sistanizadeh et al. | |
| 6,453,419 B1 | 9/2002 | Flint et al. | |
| 6,463,061 B1 | 10/2002 | Rekhter et al. | |
| 6,463,470 B1 | 10/2002 | Mohaban et al. | |
| 6,466,964 B1 * | 10/2002 | Leung et al. | 709/202 |
| 6,467,054 B1 | 10/2002 | Lenny et al. | |
| 6,470,375 B1 | 10/2002 | Whitner et al. | |
| 6,480,963 B1 * | 11/2002 | Tachibana et al. | 726/4 |
| 6,484,257 B1 | 11/2002 | Ellis | |
| 6,487,600 B1 | 11/2002 | Lynch | |
| 6,493,349 B1 | 12/2002 | Casey | |
| 6,505,192 B1 | 1/2003 | Godwin et al. | |
| 6,505,255 B1 | 1/2003 | Akatsu et al. | |
| 6,507,908 B1 | 1/2003 | Caronni | |
| 6,512,745 B1 | 1/2003 | Abe et al. | |
| 6,515,974 B1 | 2/2003 | Inoue et al. | |
| 6,532,543 B1 | 3/2003 | Smith et al. | |
| 6,546,425 B1 * | 4/2003 | Hanson et al. | 709/227 |
| 6,557,037 B1 * | 4/2003 | Provino | 709/227 |
| 6,560,707 B2 | 5/2003 | Curtis et al. | |
| 6,567,405 B1 | 5/2003 | Borella et al. | |
| 6,600,733 B2 * | 7/2003 | Deng | 370/352 |
| 6,606,708 B1 * | 8/2003 | Devine et al. | 713/201 |
| 6,615,349 B1 | 9/2003 | Hair | |
| 6,631,416 B2 * | 10/2003 | Bendinelli et al. | 709/227 |
| 6,633,538 B1 * | 10/2003 | Tanaka et al. | 370/222 |
| 6,662,198 B2 | 12/2003 | Satyanarayanan et al. | |
| 6,691,230 B1 | 2/2004 | Bardon | |
| 6,693,878 B1 | 2/2004 | Daruwalla et al. | |
| 6,697,354 B1 * | 2/2004 | Borella et al. | 370/352 |
| 6,701,437 B1 * | 3/2004 | Hoke et al. | 713/201 |
| 6,711,264 B1 | 3/2004 | Matsumoto et al. | |
| 6,745,229 B1 * | 6/2004 | Gobin et al. | 709/206 |
| 6,751,729 B1 | 6/2004 | Giniger et al. | |
| 6,755,692 B2 * | 6/2004 | Hsu | 439/620 |
| 6,788,693 B1 | 9/2004 | Christie et al. | |
| 6,804,777 B2 | 10/2004 | Hollis et al. | |
| 6,826,616 B2 | 11/2004 | Larson et al. | |
| 6,829,234 B1 | 12/2004 | Kaplan et al. | |
| 6,836,483 B1 * | 12/2004 | Lee | 370/395.31 |
| 6,859,783 B2 * | 2/2005 | Cogger et al. | 705/10 |
| 6,874,152 B2 | 3/2005 | Vermeire et al. | |
| 7,082,391 B1 * | 7/2006 | Merrill | 704/231 |
| 7,136,374 B1 | 11/2006 | Kompella | |
| 7,225,249 B1 * | 5/2007 | Barry et al. | 709/227 |
| 2002/0013848 A1 | 1/2002 | Rene Salle | |
| 2002/0099958 A1 | 7/2002 | Hrabik et al. | |

FOREIGN PATENT DOCUMENTS

| | | |
|---|---|---|
| EP | 0813 327 A2 | 12/1997 |
| EP | 0 887 981 A | 12/1998 |
| WO | WO 89/08887 | 9/1989 |
| WO | WO/97/48210 | 12/1997 |
| WO | WO 98/18269 | 4/1998 |
| WO | WO 98/32301 | 7/1998 |
| WO | WO 98/57464 | 12/1998 |
| WO | WO 99/11019 | 3/1999 |

WO WO 99/38081 7/1999

OTHER PUBLICATIONS

Chua et al., "On a Linux Implementation of Mobile IP and its Effects on TCP Performance," *Computer Communications*, vol. 22, pp. 568-588 (1999).

Chung et al., "DCOM and COBRA Side by Side, Step by Step, and Layer by Layer," *C Plus Plus Report, Sigs Publications*, vol. 10 (1998).

De Lima et al., "An Effective Selective Repeat ARQ Strategy for High Speed Point-to-Multipoint Communication," *IEEE 47th . Vehicular Technology Conference*, pp. 1059-1063 (1996).

Deng et al., "Integrating Security in CORBA Based Object Architectures," *IEEE*, pp. 50-61 (1995).

Edwards. K., "Core Jini," *Prentice Hall PTR* (1999).

Laborde, D., "Understanding and Implementing Effective VPNs", Computer Technology Review, Westworld Production Co., Los Angeles, CA, vol. 18, No. 2, Feb. 1, 1998 pp. 12, 14, 16.

Perkins, C. E., "Mobile Networking Through Mobile IP", IEEE Internet Computing, IEEE Service Center, Piscataway, New Jersey, vol. 2, No. 1, 1998, pp. 1-12.

Introduction to OrbixOTM, IONA Technologies (1999).

Orbix C++ Administrator's Guide, IONA Technologies (1999).

OrbixNames Programmer's and Administrator's Guide, IONA Technologies (1999).

DCOM Technical Overview, Microsoft Corporation (1996).

Ricciutti, M., "Iona Makes CORBA Net Friendly," CNET NEWS. COM, pp. 1-2 (1997).

Stevenson et al., "Design of a Key Agile Cryptographic System for OC-12c Rate ATM," *Network and Security System Security* pp. 17-30 (1995).

Teraoka, F., "VIP: A Protocol Providing Host Migration Transparency," *Internetworking: Research and Experience*, vol. 4, pp. 195-221 (1993).

Teraoka et al., Host Migration Transparency in IP Networks: The VIP Approach, *Computer Communication Review*, pp. 45-65 (2001).

Teraoka et al., "A Network Architecture Providing Host Migration Transparency," pp. 209-220 (1991).

Zhao et al., "Flexible Network Support for Mobility," *ACM*, pp. 145-156 (1998).

"Virtual Private Networks on Vendor Independent Networks", *IBM Technical Disclosure Bulletin*, vol. 35, No. 4A, pp. 326-329 (1992).

"V-One's SmartGate VPN", *V-One Corporation Advertisement*, pp. A5-A6.

Pakstas, A., "Towards Electronic Commerce Via Science Park Multi-Extranets", *Computer Communications*, vol. 22, pp. 1351-1363 (1999).

Wright, Michele, "Using Policies for Effective Network Management",*International Journal of Network Management*, vol. 9, pp. 118-125 (1999).

Pike, Rob et al., "Plan 9 from Bell Labs", 1995, Lucent Technologies, pp. 1-25.

Waldvogel, Marcel et al., "The VersaKey Framework: Versatile Group Key Management", Sep. 1999, Computer Engineering and Networks Laboratory (TIK), Eth Zürich, Switzerland and Sun Microsystems Inc., Network Security Group, Palo Alto, California, pp. 1-27.

SSH IPSEC Express, White Paper, Version 2.0, Mar. 1999, SSH Communications Security Ltd., pp. 1-23.

Aziz, Ashar et al., "Simple Key-Management for Internet Protocols (SKIP)", http://www.tik.ee.ethz.ch/~skip/SKIP.html, Sep. 1999, pp. 1-19.

Aziz, Ashar et al., "Design and Implementation of SKIP", INET '95 Conference, Jun. 28, 1995, pp. 1-12.

Kent, S. et al., "IP Authentication Header", ftp://ftp.isi,edu/in-notes/rfc2402.txt, Nov. 1998, pp. 1-19.

International Search Report re: PCT/US00/42630 mailed Nov. 9, 2001.

Freier et al., "The SSL Protocol Version 3.0", Internet Draft, Nov. 18, 1996, pp. 1-72.

Aziz, Ashar, "Design and Implementation of SKIP", INET 1995 Conference, Jun. 28, 1985, pp. 1-12.

McGraw, Gary et al., "Understanding the keys to Java security- the sandbox and authentication", JAVAWORLD, pp. 1-6, May 1, 1997.

Gleeson, Heinanen, Armitage, "A Framework for IP Based Virtual Private Networks" Online, retrieved from the Internet: <URL: http://www.alternic.org/drafts/drafts-g-h/draft-gleeson-vpn-framework-00.txt>, Sep. 1998.

Perkins, Charles E.., "Mobile IP," *IEEE Communications Magazine*, pp. 84-99 (1997).

Perkins, C., "IP Mobility Support," ftp://isi.edu/in-notes/rfc2002.txt, pp. 1-79 (1996).

Forman, George H., et al., "The Challenges of Mobile Computing," *University of Washington Computer Science & Engineering*, pp. 1-16 (1994).

R. Atkinson, "RFC 1825: Security Architecture for the Internet Protocol", Aug. 1995, pp. 1-21.

R. Atkinson, RFC 1827: IP Encapsulating Security Payload (ESP), Aug. 1995, pp. 1-12.

S. Kent et al., RF 2406: IP Encapsulating Security Payload (ESP), Nov. 1998, pp. 1-21.

S. Kent et al., "RFC 2401: Security Architecture for the Internet Protocol", Nov. 1998, pp. 1-67.

Wagner et al., A "Bump in the Stack" Encryptor for MS-DOS Systems, Feb. 22-23, 1996, Proceedings of the Symposium on Network and Distributed Systems Security, pp. 155-160.

Office Action mailed Jul. 30, 2007, in U.S. Appl. No. 09/457,914 (8 pages).

* cited by examiner

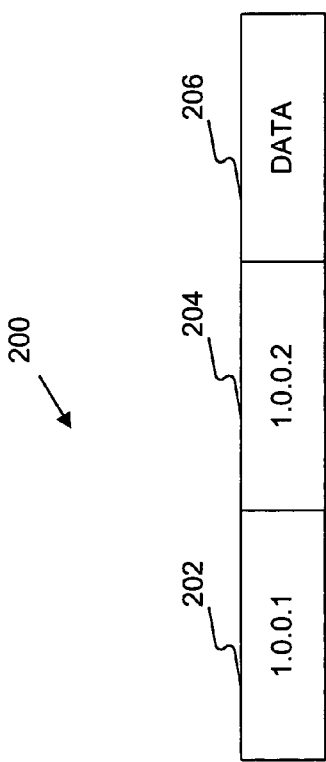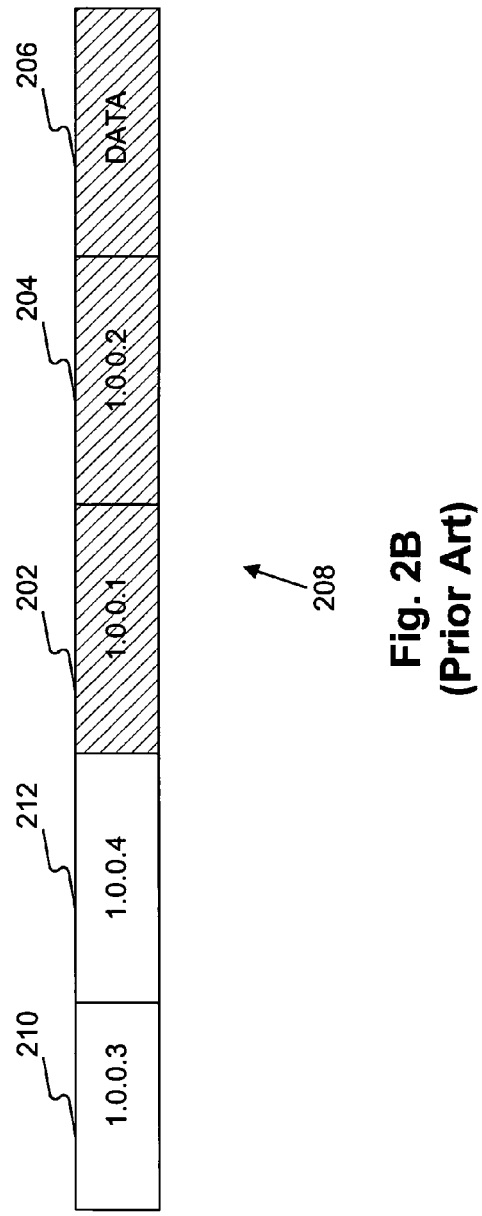

PROCESS TABLE 700

| 710 Process ID | 720 Process Descriptor | ... | 730 Supernet ID | 740 VADDR |
|---|---|---|---|---|
| 9 | FTD | ... | 0 x 123 | 10.0.0.1 |
| 8 | HTTD | ... | 0 x 123 | 10.0.0.2 |
|   |   | ... | 0 x 123 | 10.0.0.1 |

SYSTEM AND METHOD FOR ENABLING SCALABLE SECURITY IN A VIRTUAL PRIVATE NETWORK

RELATED APPLICATIONS

The following identified U.S. patent applications are relied upon and are incorporated by reference in this application.

U.S. patent application Ser. No. 09/458,043, now U.S. Pat. No. 6,970,941, entitled "SYSTEM AND METHOD FOR SEPARATING ADDRESSES FROM THE DELIVERY SCHEME IN A VIRTUAL PRIVATE NETWORK," filed Dec. 10, 1999.

U.S. patent application Ser. No. 09/457,917, entitled "TRULY ANONYMOUS COMMUNICATIONS USING SUPERNETS WITH THE PROVISION OF TOPOLOGY HIDING," filed Dec. 10, 1999, now U.S. Pat. No. 6,798,782.

U.S. patent application Ser. No. 09/457,889, now U.S. Pat. No. 6,977,929, entitled "METHOD AND SYSTEM FOR FACILITATING RELOCATION OF DEVICES ON A NETWORK," filed Dec. 10, 1999.

U.S. patent application Ser. No. 09/457,916, entitled "SANDBOXING APPLICATIONS IN A PRIVATE NETWORK USING A PUBLIC-NETWORK INFRASTRUCTURE," filed Dec. 10, 1999.

U.S. patent application Ser. No. 09/457,894, entitled "SECURE ADDRESS RESOLUTION FOR A PRIVATE NETWORK USING A PUBLIC NETWORK INFRASTRUCTURE," filed Dec. 10, 1999, now abandoned.

U.S. patent application Ser. No. 09/458,020, entitled "DECOUPLING ACCESS CONTROL FROM KEY MANAGEMENT IN A NETWORK," filed Dec. 10, 1999.

U.S. patent application Ser. No. 09/457,895, now U.S. Pat. No. 6,938,169, entitled "CHANNEL-SPECIFIC FILE SYSTEM VIEWS IN A PRIVATE NETWORK USING A PUBLIC NETWORK INFRASTRUCTURE," filed Dec. 10, 1999.

U.S. patent application Ser. No. 09/458,040, entitled "PRIVATE NETWORK USING A PUBLIC-NETWORK INFRASTRUCTURE," filed Dec. 10, 1999.

U.S. patent application Ser. No. 09/457,915, now U.S. Pat. No. 6,870,842 entitled "USING MULTICASTING TO PROVIDE ETHERNET-LIKE COMMUNICATION BEHAVIOR TO SELECTED PEERS ON A NETWORK," filed Dec. 10, 1999.

U.S. patent application Ser. No. 09/457,896, entitled "ANYCASTING IN A PRIVATE NETWORK USING A PUBLIC NETWORK INFRASTRUCTURE," filed Dec. 10, 1999, now abandoned.

U.S. patent application Ser. No. 09/458,021, entitled "SCALABLE SECURITY ASSOCIATIONS FOR GROUPS FOR USE IN A PRIVATE NETWORK USING A PUBLIC-NETWORK INFRASTRUCTURE," filed Dec. 10, 1999.

U.S. patent application Ser. No. 09/458,044, entitled "ENABLING SIMULTANEOUS PROVISION OF INFRASTRUCTURE SERVICES," filed Dec. 10, 1999, now abandoned.

FIELD OF THE INVENTION

The present invention relates generally to data processing systems and, more particularly, to a private network using a public-network infrastructure.

BACKGROUND OF THE INVENTION

As part of their day-to-day business, many organizations require an enterprise network, a private network with lease lines, dedicated channels, and network connectivity devices, such as routers, switches, and bridges. These components, collectively known as the network's "infrastructure," are very expensive and require a staff of information technology personnel to maintain them. This maintenance requirement is burdensome on many organizations whose main business is not related to the data processing industry (e.g., a clothing manufacturer) because they are not well suited to handle such data processing needs.

Another drawback to enterprise networks is that they are geographically restrictive. The term "geographically restrictive" refers to the requirement that if a user is not physically located such that they can plug their device directly into the enterprise network, the user cannot typically utilize it. To alleviate the problem of geographic restrictiveness, virtual private networks have been developed.

In a virtual private network (VPN), a remote device or network connected to the Internet may connect to the enterprise network through a firewall. This allows the remote device to access resources on the enterprise network even though it may not be located near any component of the enterprise network. For example, FIG. 1 depicts a VPN 100, where enterprise network 102 is connected to the Internet 104 via firewall 106. By using VPN 100, a remote device $D_1$ 108 may communicate with enterprise network 102 via Internet 104 and firewall 106. Thus, $D_1$ 108 may be plugged into an Internet portal virtually anywhere within the world and make use of the resources on enterprise network 102.

To perform this functionality, $D_1$ 108 utilizes a technique known as tunneling to ensure that the communication between itself and enterprise network 102 is secure in that it cannot be viewed by an interloper. "Tunneling" refers to encapsulating one packet inside another when packets are transferred between two end points (e.g., $D_1$ 108 and VPN software 109 running on firewall 106). The packets may be encrypted at their origin and decrypted at their destination. For example, FIG. 2A depicts a packet 200 with a source Internet protocol (IP) address 202, a destination IP address 204, and data 206. It should be appreciated that packet 200 contains other information not depicted, such as the source and destination port. As shown in FIG. 2B, the tunneling technique forms a new packet 208 out of packet 200 by encrypting it and adding both a new source IP address 210 and a new destination IP address 212. In this manner, the contents of the original packet (i.e., 202, 204, and 206) are not visible to any entity other than the destination. Referring back to FIG. 1, by using tunneling, remote device $D_1$ 108 may communicate and utilize the resources of the enterprise network 102 in a secure manner.

Although VPNs alleviate the problem of geographic restrictiveness, they impose significant processing overhead when two remote devices communicate. For example, if remote device $D_1$ 108 wants to communicate with remote device $D_2$ 110, $D_1$ sends a packet using tunneling to VPN software 109, where the packet is decrypted and then transferred to the enterprise network 102. Then, the enterprise network 102 sends the packet to VPN software 109, where it is encrypted again and transferred to $D_2$. Given this processing overhead, it is burdensome for two remote devices to communicate in a VPN environment.

VPNs provide security at the network layer of the OSI model and generally cover all applications. The OSI model is a well-known model used to describe the seven protocol layers in a standard TCP/IP protocol stack. The OSI model contains seven layers that use various forms of control information to communicate with their peer layers in other computer systems. This "blanket security" approach requires the VPN to secure all applications regardless of the individual needs of the application. Because of this drawback VPNs cannot differentiate between security at the application level or security at the node level. Moreover, when communicating between security domains controlled by different VPNs, multiple devices are required to allow the connection, such as firewalls and routers. These devices provide gateway services that enable data to be exchanged between various security domains.

Therefore, it is desirable to provide a dynamic security protocol that easily integrates into existing VPNs.

SUMMARY OF THE INVENTION

Methods and systems consistent with the present invention overcome the shortcomings of existing security protocols by providing dynamic security policies that may change the granularity of the security at the node level, process level, or socket level. Specifically, these shortcomings are met by having a security context that includes a channel number and virtual address associated with each process included in a process table. Since a security policy is required for all processes, secure and insecure processes located on the same channel may communicate with one another. Moreover, processes located on different channels may communicate with one another by a gateway that connects both channels. This scalable blanketing security approach provides an institutionalized method for securing any process, node or socket by providing a unique mechanism for policy enforcement at runtime or by changing the security policies.

In accordance with the purpose of the invention as embodied and broadly described herein, a method provides communication access between a first process and a second process. To provide access, the method appends security context information for the first process in a process table, and opens a socket between the first process and the second process. The method then transmits a packet from the first process to the second process through the open socket. Each packet contains security context information for the first process in the process table.

In another implementation, a method for providing secure communications between a first process and a second process is provided. The method obtains a channel number and a virtual address, and includes the channel number and the virtual address in a field corresponding to the first process in a process table. The method then transmits a datagram that contains the channel number and virtual address from the first process to a socket. The datagram is then received at the second process that contains the channel number and a second virtual address.

In another implementation, a method places processes executed in a node in a security context. The method sends a request from the node to a server to verify a username and a channel identification. In response to the request, the method receives security context information at the node from the server and initiates the process. The security context information includes a virtual address for the node. The method then appends the security context information and the channel identification for the process in a process table that is associated with the process.

This private network also provides flexible and dynamic mobility support. Sometimes, the device on which a node runs is relocated to a new physical location (e.g., a new office). In this situation, a problem arises because the nodes that send communications to the moving node will be unable to do so once the moving node relocates. This problem occurs because when the device moves, nodes that run on that device receive a new IP address. Some conventional systems solve this problem by using a proxy as a middleman between the source node and the destination node. In these systems, the source node sends a packet to the proxy, and the proxy then sends it to the destination node. Then, when the destination node moves, it updates the proxy with its new address so that it can continue to receive communications. Such systems incur significant processing overhead because of use of the proxy. The private network according to an implementation of the present invention does not use a proxy; instead, the private network sends communications directly from the sending node to the destination node.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

FIG. 2A depicts a conventional network packet;

FIG. 2B depicts the packet of FIG. 2A after it has been encrypted in accordance with a conventional tunneling technique;

FIG. 7 depicts a process table used by the VPN in a manner consistent with the present invention;

DETAILED DESCRIPTION

Methods and systems consistent with the present invention provide a "Supernet," which is a private network that uses components from a public-network infrastructure. A Supernet allows an organization to utilize a public-network infrastructure for its enterprise network so that the organization no longer has to maintain a private network infrastructure; instead, the organization may have the infrastructure maintained for them by one or more service providers or other organizations that specialize in such connectivity matters. As such, the burden of maintaining an enterprise network is greatly reduced. Moreover, a Supernet is not geographically restrictive, so a user may plug their device into the Internet from virtually any portal in the world and still be able to use the resources of their private network in a secure and robust manner.

Overview

Figure 1:
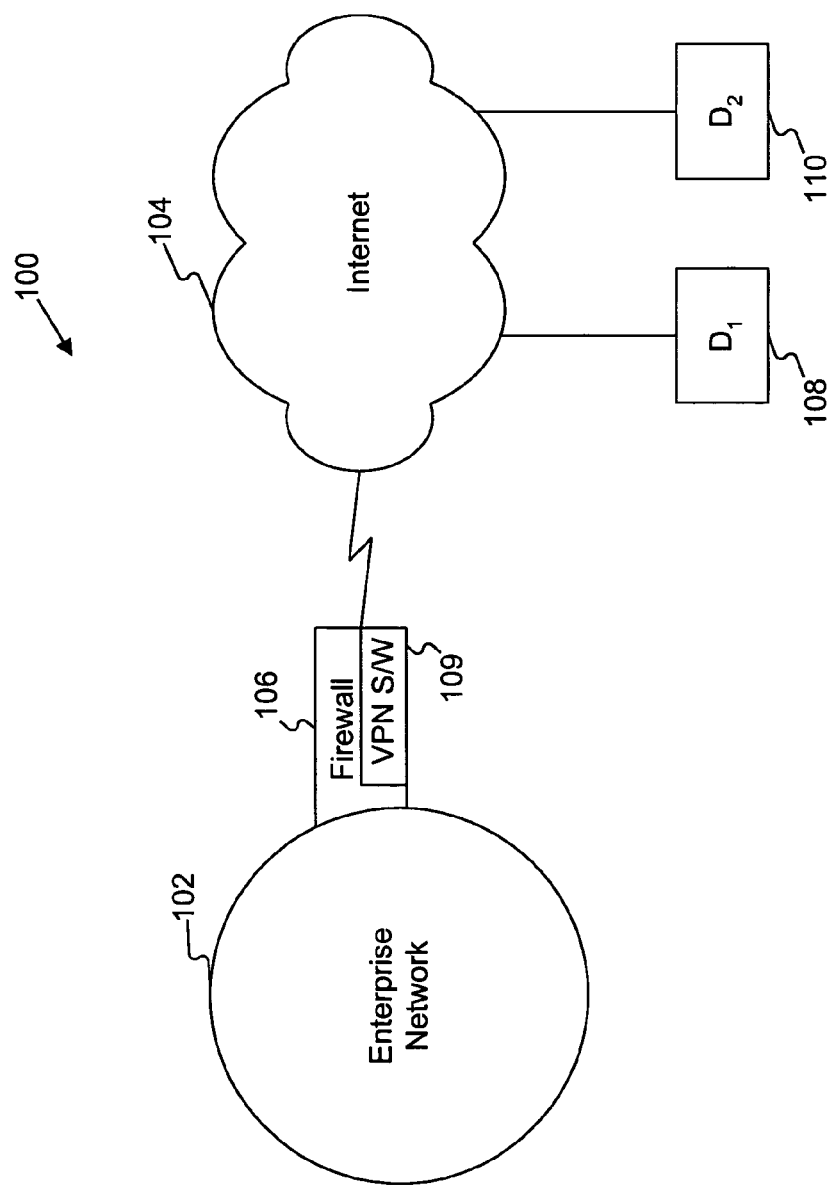
FIG. 1 depicts a conventional virtual private network (VPN) system.
Figure 3:
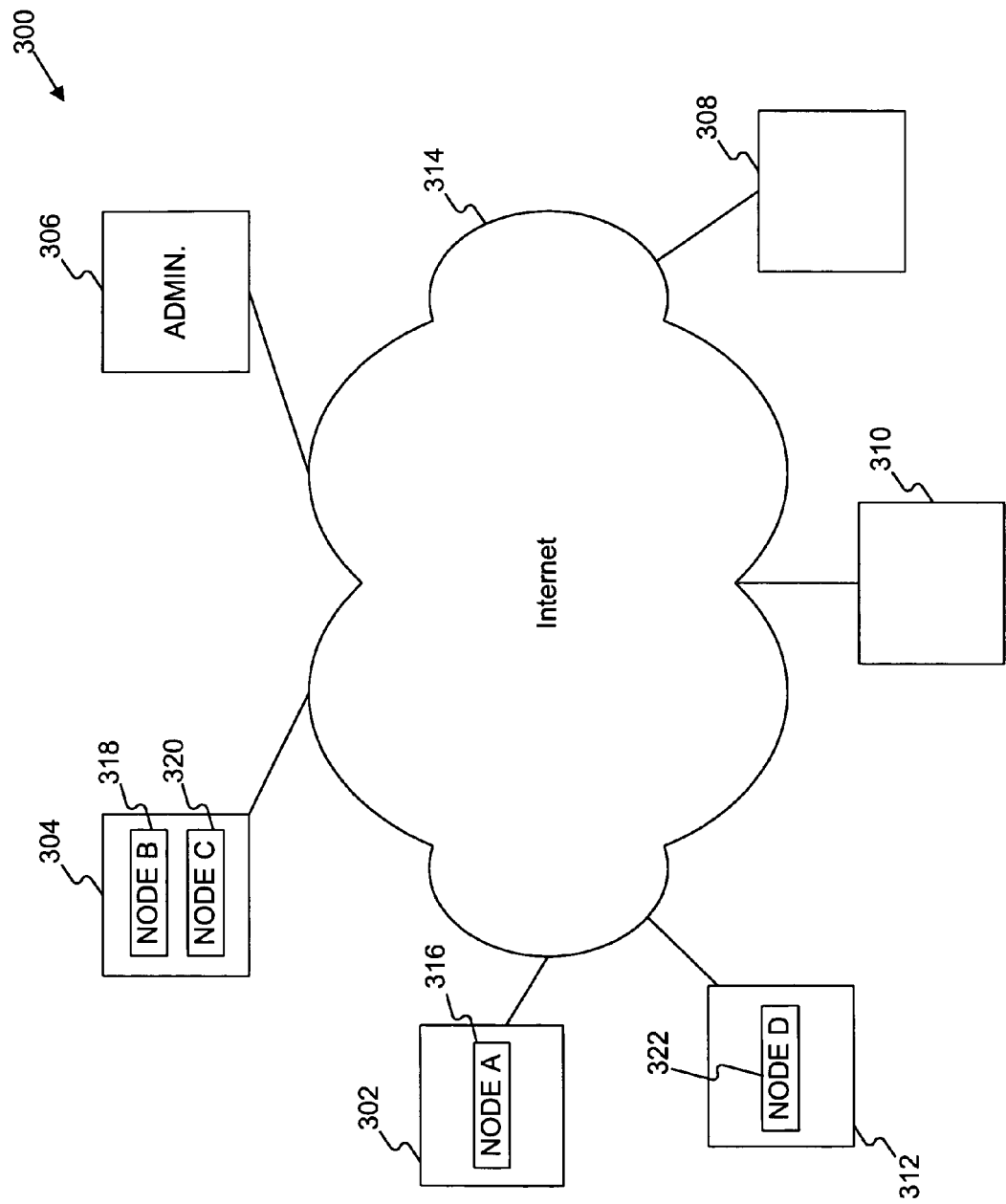
FIG. 3 depicts a data processing system suitable for use with methods and systems consistent with the present invention.

FIG. 3 depicts a data processing system 300 suitable for use with methods and systems consistent with the present invention. Data processing system 300 comprises a number of devices, such as computers 302-312, connected to a public network, such as the Internet 314. A Supernet's infrastructure uses components from the Internet because devices 302, 304, and 312 contain nodes that together form a Supernet and that communicate by using the infrastructure of the Internet. These nodes 316, 318, 320, and 322 are communicative entities (e.g., processes) running within a particular device and are able to communicate among themselves as well as access the resources of the Supernet in a secure manner. When communicating among themselves, the nodes 316, 318, 320, and 322 serve as end points for the communications, and no other processes or devices that are not part of the Supernet are able to communicate with the Supernet's nodes or utilize the Supernet's resources. The Supernet also includes an administrative node 306 to administer to the needs of the Supernet.

It should be noted that since the nodes of the Supernet rely on the Internet for connectivity, if the device on which a node is running relocates to another geographic location, the device can be plugged into an Internet portal and the node running on that device can quickly resume the use of the resources of the Supernet. It should also be noted that since a Supernet is layered on top of an existing network, it operates independently of the transport layer. Thus, the nodes of a Supernet may communicate over different transports, such as IP, IPX, X.25, or ATM, as well as different physical layers, such as RF communication, cellular communication, satellite links, or land-based links.

Figure 4:
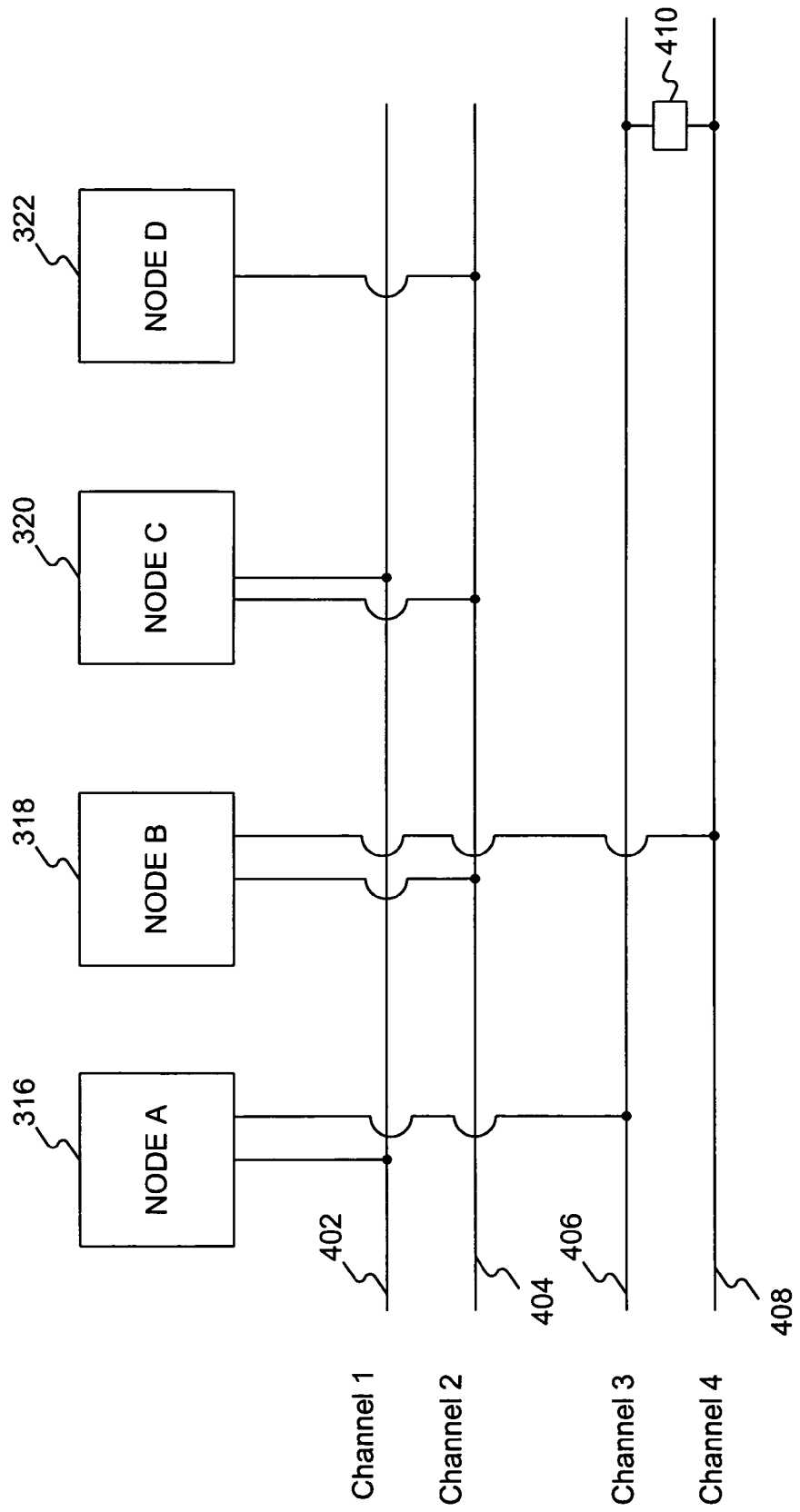
FIG. 4 depicts the nodes depicted in FIG. 3 communicating over multiple channels.

As shown in FIG. 4, a Supernet includes a number of channels that its nodes 316-322 can communicate over. A "channel" refers to a collection of virtual links through the public-network infrastructure that connect the nodes on the channel such that only these nodes can communicate over it. A node on a channel may send a message to another node on that channel, known as a unicast message, or it can send a message to all other nodes on that channel, known as a multicast message. For example, channel 1 402 connects node A 316 and node C 320, and channel 2 404 connects node B 318, node C 320, and node D 322. Each Supernet has any number of preconfigured channels over which the nodes on that channel can communicate. In an alternative embodiment, the channels are dynamically defined.

In addition to communication, the channels may be used to share resources. For example, channel 1 402 may be configured to share a file system as part of node C 320 such that node A 316 can utilize the file system of node C in a secure manner. In this case, node C 320 serves as a file system manager by receiving file system requests (e.g., open, close, read, write, etc.) and by satisfying the requests by manipulating a portion of the secondary storage on its local machine. To maintain security, node C 320 stores the data in an encrypted form so that it is unreadable by others. Such security is important because the secondary storage may not be under the control of the owners of the Supernet, but may instead be leased from a service provider. Additionally, channel 2 404 may be configured to share the computing resources of node D 322 such that nodes B 318 and C 320 send code to node D for execution. By using channels in this manner, resources on a public network can be shared in a secure manner.

A Supernet may also contain "linked" channels. These channels are linked by a gateway between the channels. The gateway allows the different channels to communicate with one another. With the gateway, a node on a channel may send a message to another node on a different channel. For example, gateway 410 connects channel 3 406 and channel 4 408. Since channels 3 and 4 are linked, node A 316 and node B 318 may communicate with each other using channel 3 406 and channel 4 408.

A Supernet provides a number of features to ensure secure and robust communication among its nodes. First, the system provides authentication and admission control so that nodes become members of the Supernet under strict control to prevent unauthorized access. Second, the Supernet provides communication security services so that the sender of a message is authenticated and communication between end points occurs in a secure manner by using encryption. By providing the security services, the Supernet enables scalable security from the socket level to the node level. Third, the system provides key management to reduce the possibility of an intruder obtaining an encryption key and penetrating a secure communication session. The system does so by providing one key per channel and by changing the key for a channel whenever a node joins or leaves the channel. Alternatively, the system may use a different security policy.

Fourth, the system provides address translation in a transparent manner. Since the Supernet is a private network constructed from the infrastructure of another network, the Supernet has its own internal addressing scheme, separate from the addressing scheme of the underlying public network. Thus, when a packet from a Supernet node is sent to another Supernet node, it travels through the public network. To do so, the Supernet performs address translation from the internal addressing scheme to the public addressing scheme and vice versa. To reduce the complexity of Supernet nodes, system-level components of the Supernet perform this translation on behalf of the individual nodes so that it is transparent to the nodes. Another benefit of the Supernet's addressing is that it uses an IP-based internal addressing scheme so that preexisting programs require little modification to run within a Supernet.

Lastly, the Supernet provides operating system-level enforcement of node compartmentalization in that an operating system-level component treats a Supernet node running on a device differently than it treats other processes on that device. This component (i.e., a security layer in a protocol stack) recognizes that a Supernet node is part of a Supernet, and therefore, it enforces that all communications to and from this node travel through the security infrastructure of the Supernet such that this node can communicate with other members of the Supernet and that non-members of the Supernet cannot access this node. Additionally, this operating system-level enforcement of node compartmentalization allows more than one Supernet node to run on the same machine, regardless of whether the nodes are from the same Supernet, and allows nodes of other networks to run on the same machine as a Supernet node.

Implementation Details

Figure 5:
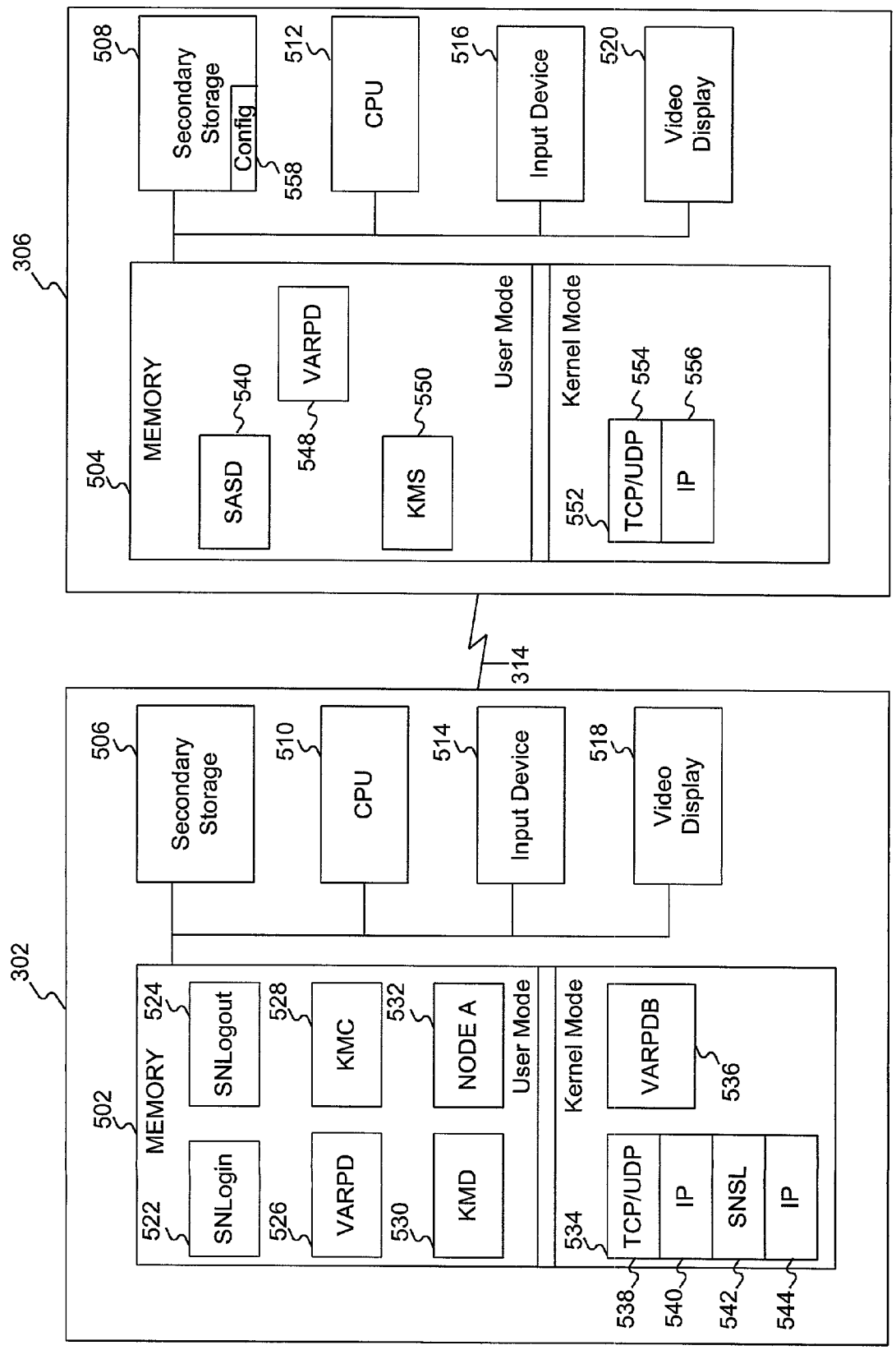
FIG. 5 depicts two devices depicted in FIG. 3 in greater detail.

FIG. 5 depicts administrative machine 306 and device 302 in greater detail, although the other devices 304 and 308-312 may contain similar components. Device 302 and administrative machine 306 communicate via Internet 314. Each device contains similar components, including a memory 502, 504; secondary storage 506, 508; a central processing unit (CPU) 510, 512; an input device 514, 516 and a video display 518, 520. One skilled in the art will appreciate that these devices may contain additional or different components.

Memory 504 of administrative machine 306 includes the SASD process 540, VARPD 548, and KMS 550 all running in user mode. That is, CPU 512 is capable of running in at least two modes: user mode and kernel mode. When CPU 512 executes programs running in user mode, it prevents them from directly manipulating the hardware components, such as video display 518. On the other hand, when CPU 512 executes programs running in kernel mode, it allows them to manipulate the hardware components. Memory 504 also contains a VARPDB and a TCP/IP protocol stack 552 that are executed by CPU 512 running in kernel mode. TCP/IP protocol stack 552 contains a TCP/UDP layer 554 and an IP layer 556, both of which are standard layers well known to those of ordinary skill in the art. Secondary storage 508 contains a configuration file 558 that stores various configuration-related information (described below) for use by SASD 540.

SASD 540 represents a Supernet: there is one instance of an SASD per Supernet, and it both authenticates nodes and authorizes nodes to join the Supernet. VARPD 548 has an associated component, VARPDB, into which it stores mappings of the internal Supernet addresses, known as a node IDs, to the network addresses recognized by the public-network infrastructure, known as the real addresses. The "node ID" may include the following: a Supernet ID (e.g., 0×123), reflecting a unique identifier of the Supernet, and a virtual address, comprising an IP address (e.g., 10.0.0.1). The "real address" is an IP address (e.g., 10.0.0.2) that is globally unique and meaningful to the public-network infrastructure. In a Supernet, one VARPD runs on each machine, and it may play two roles. First, a VARPD may act as a server by storing all address mappings for a particular Supernet into its associated VARPDB. Second, regardless of its role as a server or not, each VARPD assists in address translation for the nodes on its machine. In this role, the VARPD stores into its associated VARPDB the address mappings for its nodes, and if it needs a mapping that it does not have, it will contact the VARPD that acts as the server for the given Supernet to obtain it.

KMS 550 performs key management by generating a new key every time a node joins a channel and by generating a new key every time a node leaves a channel. There is one KMS per channel in a Supernet.

To configure a Supernet, a system administrator creates a configuration file 558 that is used by SASD 540 when starting or reconfiguring a Supernet. This file may specify: (1) the Supernet name, (2) all of the channels in the Supernet, (3) the nodes that communicate over each channel, (4) the address of the KMS for each channel, (5) the address of the VARPD that acts as the server for the Supernet, (6) the user IDs of the users who are authorized to create Supernet nodes, (7) the authentication mechanism to use for each user of each channel, and (8) the encryption algorithm to use for each channel. Although the configuration information is described as being stored in a configuration file, one skilled in the art will appreciate that this information may be retrieved from other sources, such as databases or interactive configurations.

After the configuration file is created, it is used to start a Supernet. For example, when starting a Supernet, the system administrator first starts SASD, which reads the configuration information stored in the configuration file. Then, the administrator starts the VARPD on the administrator's machine, indicating that it will act as the server for the Supernet and also starts the KMS process. After this processing has completed, the Supernet is ready for nodes to join it.

Memory 502 of device 302 contains SNlogin script 522, SNlogout script 524, VARPD 526, KMC 528, KMD 530, and node A 522, all running in user mode. Memory 502 also includes TCP/IP protocol stack 534 and VARPDB 536 running in kernel mode.

SNlogin 522 is a script used for logging into a Supernet. Successfully executing this script results in a Unix shell from which programs (e.g., node A 522) can be started to run within the Supernet context, such that address translation and security encapsulation is performed transparently for them and all they can typically access is other nodes on the Supernet. Alternatively, a parameter may be passed into SNlogin 522 that indicates a particular process to be automatically run in a Supernet context. Once a program is running in a Supernet context, all programs spawned by that program also run in the Supernet context, unless explicitly stated otherwise. SNlogout 524 is a script used for logging out of a Supernet. Although both SNlogin 522 and SNlogout 524 are described as being scripts, one skilled in the art will appreciate that their processing may be performed by another form of software. VARPD 526 performs address translation between node IDs and real addresses. KMC 528 is the key management component for each node that receives updates whenever the key for a channel ("the channel key") changes. There is one KMC per node per channel. KMD 530 receives requests from SNSL 542 of the TCP/IP protocol stack 534 when a packet is received and accesses the appropriate KMC for the destination node to retrieve the appropriate key to decrypt the packet. Node A 532 is a Supernet node running in a Supernet context.

TCP/IP protocol stack 534 contains a standard TCP/UDP layer 538, two standard IP layers (an inner IP layer 540 and an outer IP layer 544), and a Supernet security layer (SNSL) 542, acting as the conduit for all Supernet communications. To conserve memory, both inner IP layer 540 and outer IP layer 544 may share the same instance of the code of an IP layer. SNSL 542 performs security functionality as well as address translation. It also caches the most recently used channel keys for ten seconds. Thus, when a channel key is needed, SNSL 542 checks its cache first, and if it is not found, it requests KMD 530 to contact the appropriate KMC to retrieve the appropriate channel key. Two IP layers 540, 544 are used in the TCP/IP protocol stack 534 because both the internal addressing scheme and the external addressing scheme are IP-based. Thus, for example, when a packet is sent, inner IP layer 540 receives the packet from TCP/UDP layer 538 and processes the packet with its node ID address before passing it to the SNSL layer 542, which encrypts it, prepends the real source IP address and the real destination IP address, and then passes the encrypted packet to outer IP layer 544 for sending to the destination.

SNSL 542 utilizes VARPDB 536 to perform address translation. VARPDB stores all of the address mappings encountered thus far by SNSL 542. If SNSL 542 requests a mapping that VARPDB 536 does not have, VARPDB communicates with the VARPD 526 on the local machine to obtain the mapping. VARPD 526 will then contact the VARPD that acts as the server for this particular Supernet to obtain it.

Although aspects of the present invention are described as being stored in memory, one skilled in the art will appreciate that these aspects can also be stored on or read from other types of computer-readable media, such as secondary storage devices, like hard disks, floppy disks, or CD-ROM; a carrier wave from a network, such as the Internet; or other forms of RAM or ROM either currently known or later developed. Additionally, although a number of the software components are described as being located on the same machine, one skilled in the art will appreciate that these components may be distributed over a number of machines.

Figure 6A:
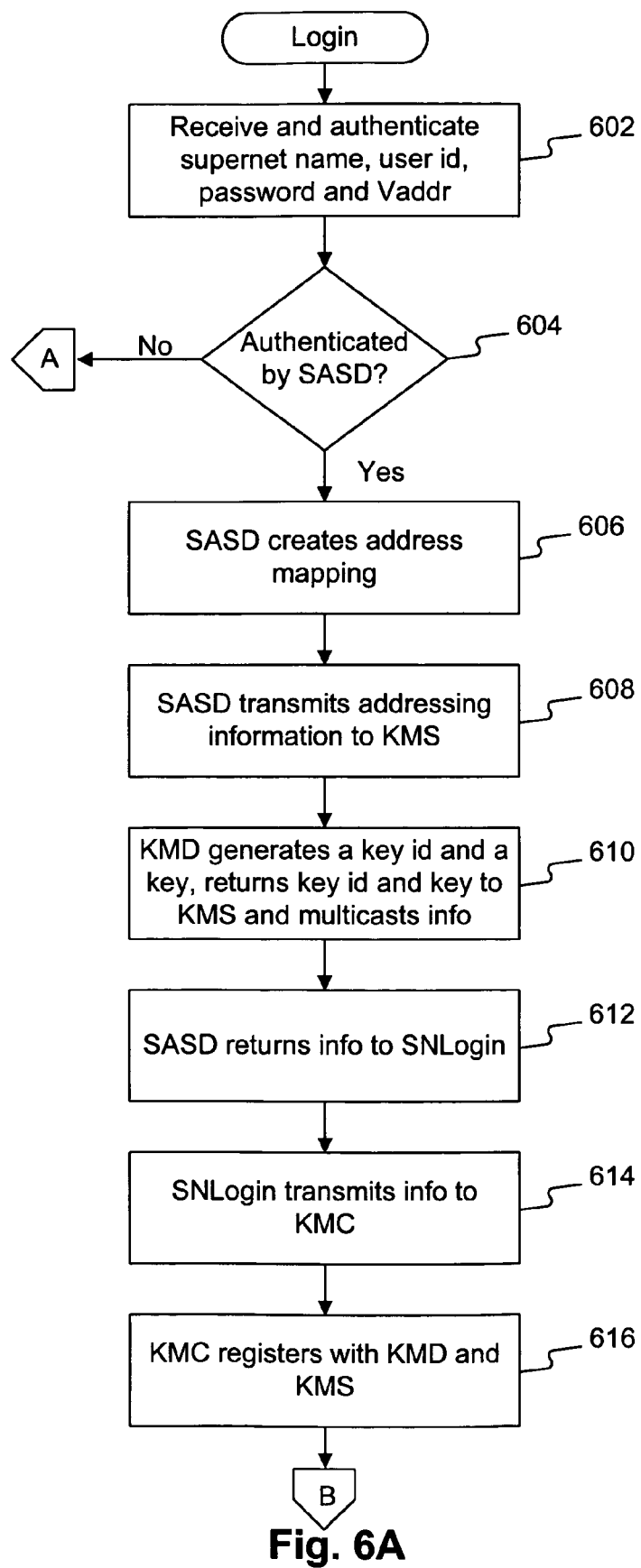
FIGS. 6A and 6B depict a flow chart of the steps performed when a node joins a VPN in a manner consistent with the present invention.
Figure 6B:
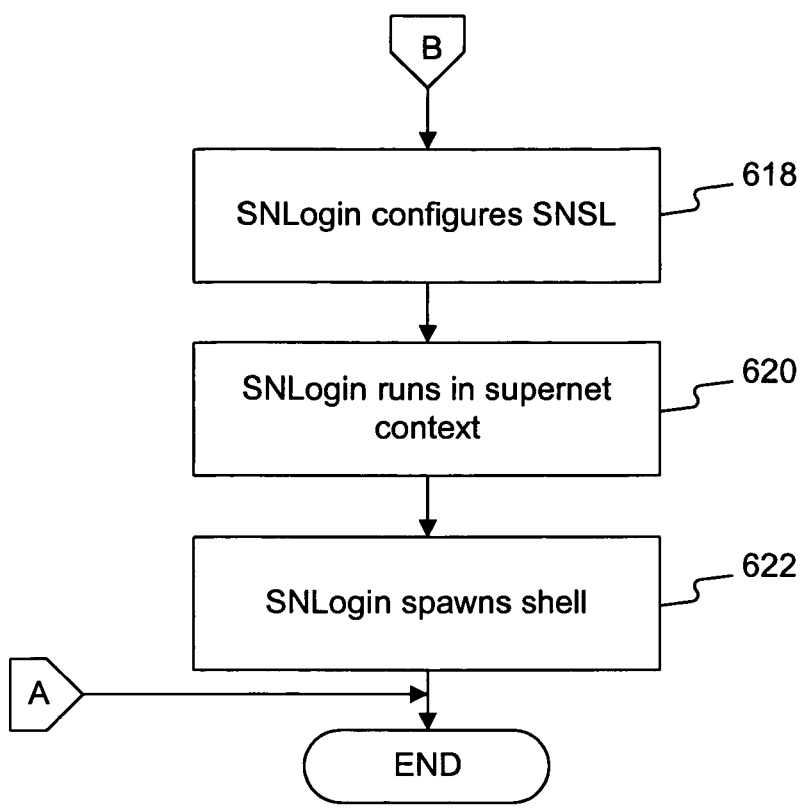

FIGS. 6A and 6B depict a flow chart of the steps performed when a node joins a Supernet. The first step performed is that the user invokes the SNlogin script and enters the Supernet name, their user ID, their password, and a requested virtual address (step 602). Of course, this information depends on the particular authentication mechanism used. Upon receiving this information, the SNlogin script performs a handshaking with SASD to authenticate this information. In this step, the user may request a particular virtual address to be used, or alternatively, the SASD may select one for them. Next, if any of the information in step 602 is not validated by SASD (step 604), processing ends. Otherwise, upon successful authentication, SASD creates an address mapping between a node ID and the real address (step 606). In this step, SASD concatenates the Supernet ID with the virtual address to create the node ID, obtains the real address of the SNlogin script by querying network services in a well-known manner, and then registers this information with the VARPD that acts as the server for this Supernet. This VARPD is identified in the configuration file. If the node uses multiple channels to communicate, SASD sends the address mapping to the VARPD that acts as a server for that Supernet.

After creating the address mapping, SASD informs the KMS that there is a new Supernet member that has been authenticated and admitted (step 608). In this step, SASD sends the node ID and the real address to KMS who then generates a key ID, a key for use in communicating between the node's KMC and the KMS ("a node key"), and updates the channel key for use in encrypting traffic on this particular channel (step 610). Additionally, KMS sends the key ID and the node key to SASD and distributes the channel key to all KMCs on the channel as a new key because a node has just been added to the channel. SASD receives the key ID and the node key from KMS and returns it to SNlogin (step 612). After receiving the key ID and the node key from SASD, SNlogin starts a KMC for this node and transmits to the KMC the node ID, the key ID, the node key, the address of the VARPD that acts as the server for this Supernet, and the address of KMS (step 614). The KMC then registers with the KMD indicating the node it is associated with, and KMC registers with KMS for key updates (step 616). When registering with KMS, KMC provides its address so that it can receive updates to the channel key via the Versakey protocol. The Versakey protocol is described in greater detail in *IEEE Journal on Selected Areas in Communication*, Vol. 17, No. 9, 1999, pp. 1614-1631. After registration, the KMC will receive key updates whenever a channel key changes on one of the channels that the node communicates over.

Next, SNlogin configures SNSL (step 618 in FIG. 6B). In this step, SNlogin indicates which encryption algorithm to use for this channel and which authentication algorithm to use, both of which are received from the configuration file via SASD. SNSL stores this information in an access control list. In accordance with methods and systems consistent with present invention, any of a number of well-known encryption algorithms may be used, including the Data Encryption Standard (DES), Triple-DES, the International Data Encryption Algorithm (IDEA), and the Advanced Encryption Standard (AES). Also, RC2, RC4, and RC5 from RSA Incorporated may be used as well as Blowfish from Counterpane.com. Additionally, in accordance with methods and systems consistent with the present invention, any of a number of well-known authentication algorithms may be used, including Digital Signatures, Kerberos, Secure Socket Layer (SSL), and MD5, which is described in RFC1321 of the Internet Engineering Task Force, April, 1992.

After configuring SNSL, SNlogin invokes an operating system call, SETVIN, to cause the SNlogin script to run in a Supernet context (step 620). In Unix, each process has a data structure known as the "proc structure" that contains the process ID as well as a pointer to a virtual memory description of this process. FIG. 7 depicts a process table 700 that lists all of the proc structures currently executing in memory. The columns 710, 720, 730, and 740 show data regarding the attributes of each process. A record 750 includes for each process: a process ID 710; a process name 720; a Supernet ID 730 indicating the channel the process belongs; and vaddr 740 indicating the virtual address for the node. One skilled in the art will appreciate that process table 700 may contain additional information to maintain the process. To join multiple Supernets, the user repeats the steps of FIGS. 6A and 6B for each Supernet.

In accordance with methods and systems consistent with the present invention, the IDs indicating the channels over which the process communicates as well as its virtual address for this process are added to this structure. By associating this information with the process in process table 700, the SNSL layer can enforce that this process runs in a Supernet context. Also during step 620, a gateway may be initiated to communicate across multiple channels. To do so, SNlogin executes a gateway process that spawns two child processes, both of which are connected by a shared-memory region in memory. Each child process connects one channel to the shared gateway process. Alternatively, Snlogin may execute a "privileged process" that determines which channels belongs in the gateway. The privileged process is capable of connecting any channel and is created by a user with access to all channels (e.g., a superuser). This process forwards information from a first socket to a second socket within an address space of the privileged process to establish the gateway. Although methods and systems consistent with the present invention are described as operating in a Unix environment, one skilled in the art will appreciate that such methods and systems can operate in other environments. After the SNlogin script runs in the Supernet context, the SNlogin script spawns a Unix program, such as a Unix shell or a service daemon (step 622). In this step, the SNlogin script spawns a Unix shell from which programs can be run by the user. All of these programs will thus run in the Supernet context until the user runs the SNlogout script.

Figure 8:
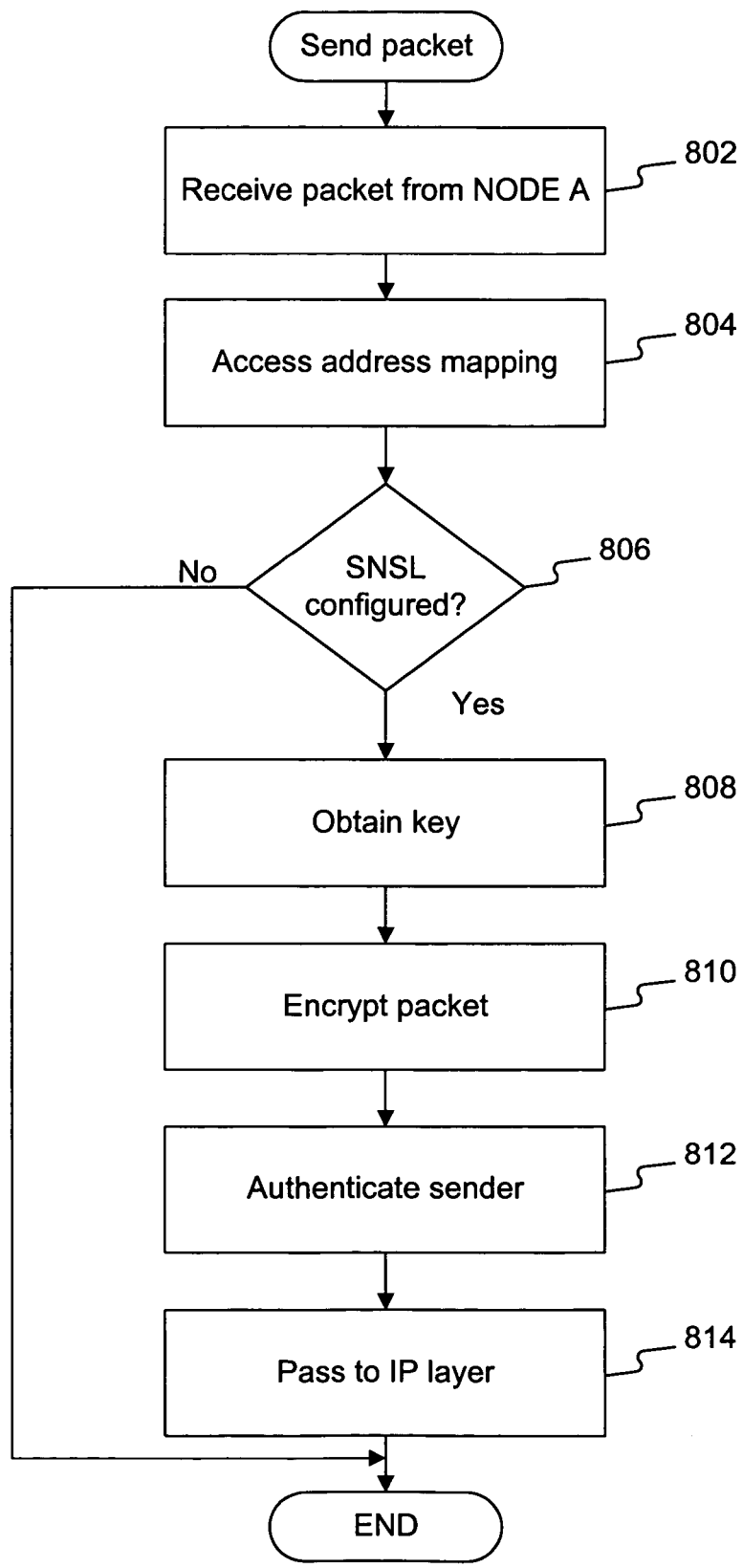
FIG. 8 depicts a flow chart of the steps performed when sending a packet from a node of the VPN in a manner consistent with the present invention.

FIG. 8 depicts a flow chart of the steps performed when sending a packet from node A. Although the steps of the flow chart are described in a particular order, one skilled in the art will appreciate that these steps may be performed in a different order. Additionally, although the SNSL layer is described as performing both authentication and encryption, this processing is policy driven such that either authentication, encryption, both, or neither may be performed. The first step performed is for SNSL layer 542 to receive a packet originating from node A via the TCP/UDP layer and the inner IP layer 540 (step 802). The packet contains a source node ID, a destination node ID, and data. The packet may be received from a process executing in node A connected to a socket. A socket is a well-known software object that connects an application to a network protocol. In UNIX, for example, an application can send and receive TCP/IP messages by opening a socket and reading and writing data to and from the socket. When the packet is received, a Supernet ID and virtual address are appended to a socket structure. The socket structure is modified so as to contain an extra data field for the Supernet ID and virtual address. The addition of a Supernet ID and virtual address in the socket structure enables the Supernet to provide flexible security at a socket level, process level, or node level since the socket structure can discard packets when the sending application/node/process is prohibited from using that channel. Therefore, when a process executing on node A opens a socket to transmit the packet to SNSL layer 542 (step 802), the corresponding Supernet ID and virtual address for that process are also included in the socket request.

The SNSL layer then accesses the VARPDB to obtain the address mapping between the source node ID and the source real address as well as the destination node ID and the destination real address (step 804). If they are not contained in the VARPDB because this is the first time a packet has been sent from this node or sent to this destination, the VARPDB accesses the local VARPD to obtain the mapping. When contacted, the VARPD on the local machine contacts the VARPD that acts as the server for the Supernet to obtain the appropriate address mapping.

After obtaining the address mapping, the SNSL layer determines whether it has been configured to communicate over the appropriate channel for this packet (step 706). This configuration occurs when SNlogin runs, and if the SNSL has not been so configured, processing ends. Otherwise, SNSL obtains the channel key to be used for this channel (step 808). The SNSL maintains a local cache of keys and an indication of the channel to which each key is associated. Each channel key is time stamped to expire in ten seconds, although this time is configurable by the administrator. If there is a key located in the cache for this channel, SNSL obtains the key. Otherwise, SNSL accesses KMD which then locates the appropriate channel key from the appropriate KMC. After obtaining the key, the SNSL layer encrypts the packet using the appropriate encryption algorithm and the key previously obtained (step 810). When encrypting the packet, the source node ID, the destination node ID, and the data may be encrypted, but the source and destination real addresses are not, so that the real addresses can be used by the public network infrastructure to send the packet to its destination.

After encrypting the packet, the SNSL layer authenticates the sender to verify that it is the bona fide sender and that the packet was not modified in transit (step 812). In this step, the SNSL layer uses the MD5 authentication protocol, although one skilled in the art will appreciate that other authentication protocols may be used. Next, the SNSL layer passes the packet to the IP layer where it is then sent to the destination node in accordance with known techniques associated with the IP protocol (step 814).

Figure 9:
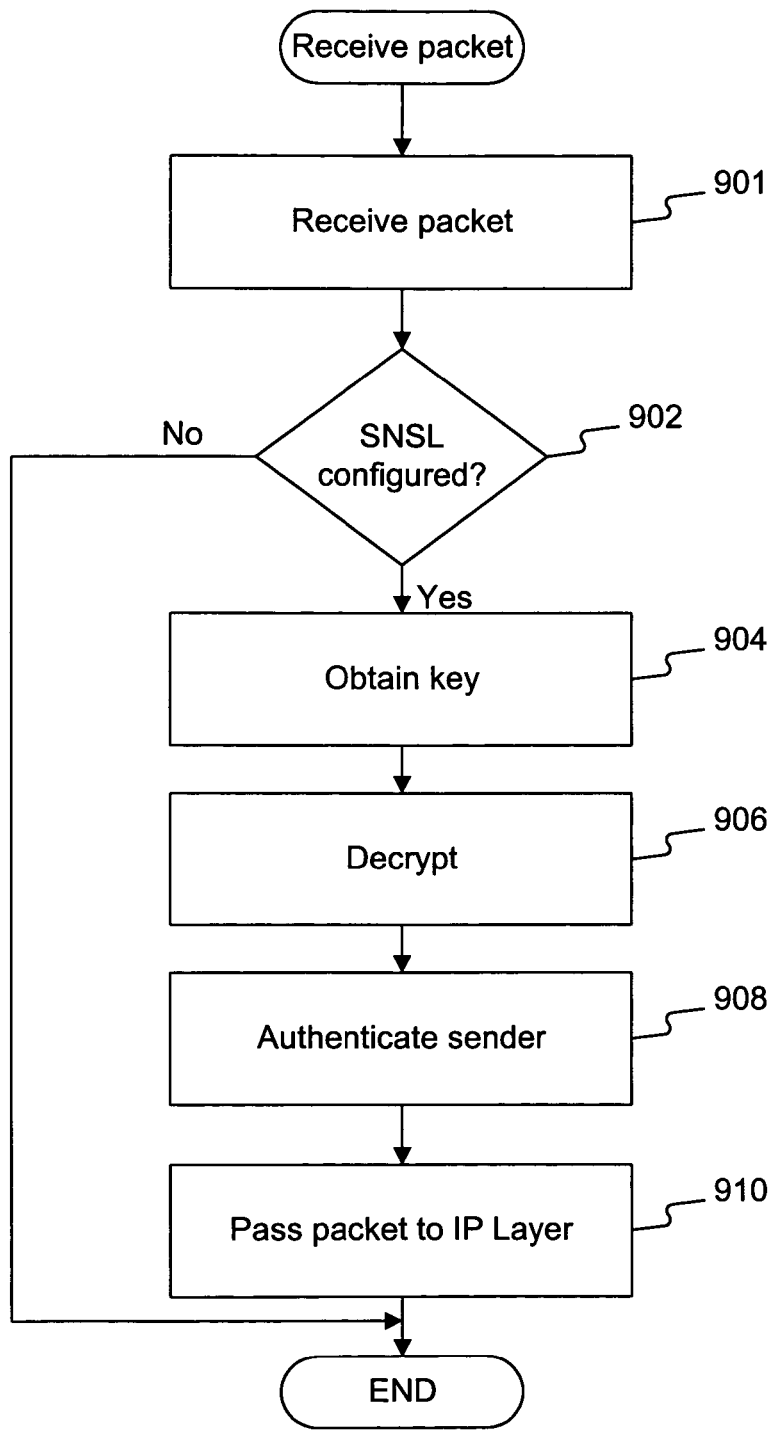
FIG. 9 depicts a flow chart of the steps performed when receiving a packet by a node of the VPN in a manner consistent with the present invention.

FIG. 9 depicts a flow chart of the steps performed by the SNSL layer when it receives a packet. Although the steps of the flow chart are described in a particular order, one skilled in the art will appreciate that these steps may be performed in a different order. Additionally, although the SNSL layer is described as performing both authentication and encryption, this processing is policy driven such that either authentication, encryption, both, or neither may be performed. To decapsulate the packet with the additional information (Supernet ID and virtual address), similar to the sending node, the receiving node uses a modified socket structure. The first step performed by the SNSL layer is to receive a packet from the network (step 901). This packet contains a real source address and a real destination address that are not encrypted as well as a source node ID, a destination node ID, and data that are encrypted. Then, it determines whether it has been configured to communicate on this channel to the destination node (step 902). If SNSL has not been so configured, processing ends. Otherwise, the SNSL layer obtains the appropriate key as previously described (step 904). It then decrypts the packet using this key and the appropriate encryption algorithm (step 906). After decrypting the packet, the SNSL layer authenticates the sender and validates the integrity of the packet (step 908), and then it passes the packet to the inner IP layer for delivery to the appropriate node (step 910). To pass the additional information to the other IP layers, the packet is passed using a modified socket structure, as described above. Upon receiving the packet, the inner IP layer uses the destination node ID to deliver the packet.

Figure 10:
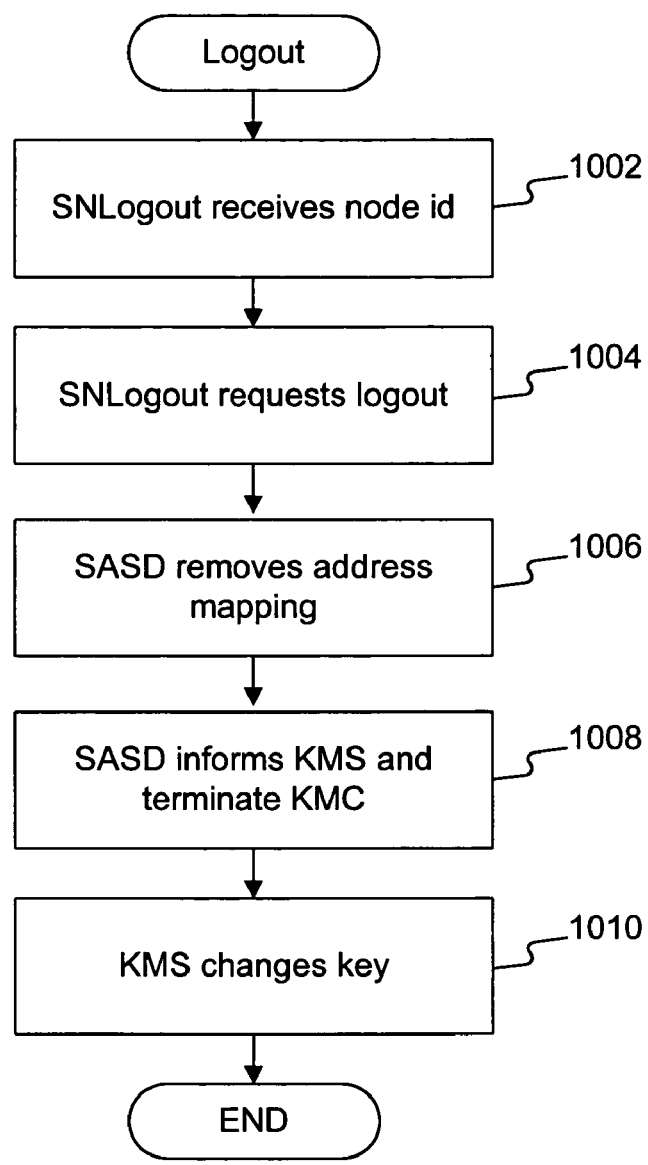
FIG. 10 depicts a flow chart of the steps performed when logging out of a VPN in a manner consistent with the present invention.

FIG. 10 depicts a flow chart of the steps performed when logging a node out of a Supernet. The first step performed is for the user to run the SNlogout script and to enter a node ID (step 1002). Next, the SNlogout script requests a log out from SASD (step 1004). Upon receiving this request, SASD removes the mapping for this node from the VARPDB that acts as the server for the Supernet (step 1006). SASD then informs KMS to cancel the registration of the node, and KMS terminates this KMC (step 1008). Lastly, KMS generates a new channel key for the channels on which the node was communicating (step 1010) to reduce the likelihood of an intruder being able to intercept traffic.

CONCLUSION

Although the present invention has been described with reference to a preferred embodiment, those skilled in the art will know of various changes in form and detail which may be made without departing from the spirit and scope of the present invention as defined in the appended claims and their full scope of equivalents.

What is claimed is:

1. A method executed in a data processing system for providing communication access between a first process associated with a first node and a second process associated with a second node, the method comprising:

sending a request from the first node to an administrative machine to verify a first node identification associated with the first process;

in response to the request, receiving security context information at the first node from the administrative machine, the security context information comprising a virtual address for the first node;

appending the security context information for the first process in a process table, the process table listing a first process identifier associated with the first process executing in memory;

opening a socket between the first process and the second process;

transmitting a packet from the first process to the second process through the open socket without passing through the administrative machine, only after determining that the first process and the second process are connected by at least one of (i) a channel and (ii) a plurality of channels linked by a gateway, the packet comprising the security context information for the first process in the process table, each said channel comprising a collection of virtual links through a public network infrastructure; and receiving the transmitted packet.

2. The method of claim 1, further comprising modifying a socket structure so as to accept the security context information.

3. The method of claim 1, further comprising:

receiving the packet at the second process through the socket;

verifying the security context information received in the packet; and permitting use of the packet if the security context information is verified.

4. The method of claim 1, wherein determining that the first process and the second process are connected by at least one of (i) a channel and (ii) a plurality of channels linked by a gateway comprises:

comparing the security context information in the packet and security context information in another process table.

5. The method of claim 3, wherein verifying the security context information comprises:

determining whether the first and second process belong to two different linked channels; and permitting use of the packet when the different channels are linked.

6. The method of claim 5, wherein determining whether the first and second process belong to two different linked channels comprises:

initiating a process that spawns two child processes that are connected by a shared-memory region in a memory.

7. The method of claim 5, wherein permitting use of the packet comprises:

decrypting the packet; and authenticating a sender associated with the first process.

8. The method of claim 1, wherein appending security context information comprises:

obtaining the security context information from a third process, the security context information comprising a virtual address and a node identification.

9. The method of claim 1, further comprising:

modifying a network stack such that the network stack requires the security context information to be present in the socket structure to transmit.

10. The method of claim 1, wherein receiving security context information further comprises:

receiving a key that corresponds to the first node identification from the server.

11. The method of claim 10, further comprising:

encrypting a packet transmitted by the first process using the key;

encapsulating the encrypted packet with a header that comprises the first node identification.

12. The method of claim 1, further comprising:

sending a second request from the second node to the server to verify a second node identification;

receiving additional security context information from the server, wherein the additional security context information comprises a second virtual address for the second node;

creating the second process; and appending the security context information for the second process in the process table associated with the second process.

13. A method executed in a data processing system for providing secure communications between a first process associated with a first node and a second process associated with a second node, the method comprising:

obtaining a node identification comprising a virtual address from an administrative machine;

including the node identification in a field corresponding to the first process in a process table, the process table listing a first process identifier associated with the first process executing in memory;

transmitting, only after determining that the first process and the second process are connected by at least one of (i) a channel and (ii) a plurality of channels linked by a gateway, a datagram that contains the node identification from the first process to a socket, each said channel comprising a collection of virtual links through a public network infrastructure;

receiving the datagram at the second process that contains the node identification and a second virtual address, without the datagram passing through the administrative machine.

14. The method of claim 13, wherein obtaining a node identification further comprises:

modifying a socket structure in the socket so that the socket structure accepts the node identification; and modifying a process table so that the table comprises a node identification field.

15. A system for providing communication access between a first process associated with a first node corresponding to a first computer system and a second process associated with a second node corresponding to a second computer system networked via a public network infrastructure to the first computer system, the system including the first computer system and the second computer system, the first computer system comprising:

means for sending, across the public network, a request from the first node to an administrative machine associated with a private network to verify a first node identification associated with the first process;

means for receiving security context information, in response to the request, at the first node from the administrative machine, the security context information comprising a virtual address for the first node;

means for appending the security context information for the first process in a process table, the process table listing a first identifier associated with the first process executing in memory;

means for opening a socket between the first process and the second process;

means for determining that the first process and the second process are connected by at least one of (i) a channel and (ii) a plurality of channels linked by a gateway, each said channel comprising a collection of virtual links through a public network infrastructure;

means for transmitting a packet from the first process to the second process through the open socket without passing through the administrative machine, the packet comprising the security context information for the first process in the process table; and means for receiving the transmitted packet.

16. The system of claim 15, further comprising means for modifying a socket structure so as to accept the security context information.

17. The system of claim 15, further comprising:

means for verifying the security context information received in the packet; and means for permitting use of the packet if the security context information is verified.

18. The system of claim 15, wherein means for determining if the first and second process belong to a channel comprises:

means for comparing the security context information in the received packet and security context information in another process table.

19. The system of claim 17, wherein means for verifying the security context information comprises:

means for determining whether the first and second process belong to two different linked channels; and means for permitting use of the packet when the different channels are linked.

20. The system of claim 19, wherein means for determining whether the first and second process belong to two different linked channels comprises:
   means for initiating a process that spawns two child processes that are connected by a shared-memory region in a memory.

21. The system of claim 19, wherein means for permitting use of the packet comprises:
   means for decrypting the packet; and
   means for authenticating a sender associated with the first process.

22. The system of claim 15, wherein means for appending security context information comprises:
   means for obtaining the security context information from a third process, the security context information comprising a virtual address and a node identification.

23. The system of claim 15, further comprising:
   means for modifying a network stack such that the network stack requires the security context information to be present in the socket structure to transmit.

24. A system for placing a process executed in a node in a security context, comprising:
   an administrative machine; and
   a sending node comprising:
      a transmission module that transmits a request to the administrative machine to verify a sending node identification, and receives security context information from the administrative machine in response to the request, wherein the security context information comprises a virtual address for the sending node;
      memory containing a process and an associated process table, the process table listing a first process identifier associated with the first process executing in memory;
      an appending module that appends the received security context information and the sending node identification for the process in the process table, wherein the transmission module transmits a packet from the process to a receiving node without passing through the administrative machine, only after determining that the first process and the second process are connected by at least one of (i) a channel and (ii) a plurality of channels linked by a gateway, the packet comprising the security context information for the first process in the process table, each said channel comprising a collection of virtual links through a public network infrastructure; and
   means for receiving the transmitted packet.

25. The system of claim 24, wherein the transmission module further receives a key that corresponds to the sending node identification from the administrative machine.

26. The system of claim 25, further comprising: an encryption module that encrypts the packet transmitted by the process using the key; and
   an encapsulating module that encapsulates the encrypted packet with a header that comprises the sending node identification.

27. A system for providing secure communications between a first process associated with a first node corresponding to a first computer system and a second process associated with a second node corresponding to a second computer system networked via a public network infrastructure to the first computer system, the system including the first computer system and the second computer system, the first computer system comprising:
   means for obtaining a node identification comprising a virtual address from an administrative machine connected to the first computer system via the public network infrastructure;
   means for including the node identification in a field corresponding to the first process in a process table, the process table listing a first process identifier associated with the first process executing in memory;
   means for transmitting a datagram that contains the node identification from the first process to a socket;
   means for determining that the first process and the second process are connected by at least one of (i) a channel and (ii) a plurality of channels linked by a gateway, each said channel comprising a collection of virtual links through a public network infrastructure;
   means for receiving the datagram at the second process that contains the node identification and a second virtual address, without the datagram passing through the administrative machine; and
   means for accepting the transmitted packet.

28. The system of claim 27, wherein means for obtaining a node identification further comprises:
   means for modifying a socket structure in the socket so that the socket structure accepts the node identification; and
   means for modifying a process table so that the table comprises a node identification field.

29. A computer readable storage medium installable on a networked computer system in a data processing system, wherein the computer-readable storage medium includes a plurality of modules having a set of instructions which when executed by a processor of the computer system operate to control the data processing system to perform a method for providing communication access between a first process associated with a first node disposed on the computer system and a second process associated with a second node, the modules comprising:
   a sending module for sending a request from the first node to an administrative machine to verify a first node identification associated with the first process;
   a receiving module for receiving security context information, in response to the request, at the first node from the administrative machine, the security context information comprising a virtual address for the first node;
   an appending module for appending security context information for the first process in a process table, the process table listing a first process identifier associated with the first process executing in memory;
   an opening module for opening a socket between the first process and the second process;
   a transmitting module for transmitting a packet from the first process to the second process through the open socket without passing through the administrative machine, only after determining that the first process and the second process are connected by at least one of (i) a channel and (ii) a plurality of channels linked by a gateway, the packet comprising the security context information for the first process in the process table, each said channel comprising a collection of virtual links through a public network infrastructure; and
   a receiving module for receiving the transmitted packet.

30. The computer readable medium of claim 29, further comprising a modifying module for modifying a socket structure so as to accept the security context information.

31. The computer readable medium of claim 29, further comprising:
   a receiving module for receiving the packet at the second process through the socket;

a verifying module for verifying the security context information received in the packet; and a permitting module for permitting use of the packet if the security context information is verified.

32. The computer readable medium of claim 31, wherein the verifying module comprises:

a determining module for determining whether the first and second process belong to two different linked channels; and a permitting module for permitting use of the packet when the different channels are linked.

33. The computer readable medium of claim 32, wherein the determining module comprises:

a comparing module that compares the security context information in the received packet and security context information in another process table.

34. The computer readable medium of claim 32, wherein the determining module comprises a initiating module that initiates a process that spawns two child processes that are connected by a shared-memory region in a memory.

35. The computer readable medium of claim 32, wherein the permitting module comprises:

a decrypting module for decrypting the packet; and an authenticating module for authenticating a sender associated with the first process.

36. The computer readable medium of claim 29, wherein the appending module comprises:

an obtaining module for obtaining the security context information from a third process, the security context information comprising a virtual address and a node identification; and a limiting module for limiting each of the first, second and third processes to communicate with another process provided that the communicating processes share the same node identification.

37. The computer readable medium of claim 29, further comprising:

a modifying module for modifying a network stack such that the network stack requires the security context information to be present in the socket structure to transmit.

* * * * *